United States Patent [19]

Shanks

[11] 4,109,241
[45] Aug. 22, 1978

[54] LIQUID CRYSTAL DISPLAYS

[75] Inventor: Ian Alexander Shanks, Malvern, England

[73] Assignee: The Secretary of State for Defence in Her Britannic Majesty's Government of Great Britain and Northern Ireland, London, England

[21] Appl. No.: 639,434

[22] Filed: Dec. 10, 1975

[30] Foreign Application Priority Data

Dec. 11, 1974 [GB] United Kingdom ............... 53685/74

[51] Int. Cl.² .............................................. G02F 1/13
[52] U.S. Cl. .................................. 340/324 M; 350/333
[58] Field of Search .............. 340/324 R, 324 M, 336; 350/160 LC; 178/7.3 D

[56] References Cited

U.S. PATENT DOCUMENTS

| | | | |
|---|---|---|---|
| 3,575,492 | 4/1971 | Nester et al. | 350/160 LC |
| 3,703,331 | 11/1972 | Goldmacher et al. | 350/160 LC |
| 3,864,022 | 2/1975 | Moriyama et al. | 350/160 LC |
| 3,895,373 | 7/1975 | Freiser et al. | 340/324 M |

Primary Examiner—David L. Trafton
Attorney, Agent, or Firm—Stevens, Davis, Miller & Mosher

[57] ABSTRACT

A liquid crystal display comprises a liquid crystal material layer contained between transparent slides which carry electrodes arranged in lines and columns to form an $x, y$ matrix with $x, y$ intersections. The liquid crystal layer at the intersections are turned on line by line by a blanking voltage, turned off by application of a zero voltage, and held at a threshold voltage at other times. The voltages are applied from a three phase supply by applying one phase to $x$ electrodes a second phase to the $y$ electrodes to maintain a threshold voltage at $x, y$ intersections, and applying the third phase to both $x, y$ electrodes for turning an intersection off. Alternatively the voltages may be applied from a two different frequency waveform supply.

9 Claims, 7 Drawing Figures

LIQUID CRYSTAL DISPLAYS

This invention relates to liquid crystal displays in which selected parts of a display are addressed in matrix form.

Liquid crystal displays are commonly formed by enclosing a thin layer e.g. 12 μm thick, between glass slides provided on their inner faces with transparent electrodes. Application of a voltage to the electrodes causes a change in optical properties in the liquid crystal between the electrodes, removal of the voltage allows the liquid crystal to relax back to its original state. Thus for example a part of a display can be made to appear transparent in a coloured background, or vice versa, and this is usefully used in digital watch displays. For simple displays such as small numeric watch displays only a relatively few electrodes are required. However for a larger display it becomes impractical to provide an individual pair of electrodes to each part of the display requiring addressing.

One solution to the addressing of large displays commonly used in electro-optic displays is to address in a matrix, i.e. use a series of long column electrodes on one of the glass slides and a series of long line electrodes on the other glass slide. Thus by applying a voltage to a particular column and a line electrode liquid crystal between the intersection of those two electrodes is addressed. A similar technique may also be used to multiplex the addressing of seven segment type digital displays.

Unfortunately the time required for a liquid crystal to change its optical property on application of an electrical voltage i.e. its 'on' state, and the time required to relax back to its original 'off' state after removal of the voltage is frequently incompatable with matrix addressing or multiplexing. This is because the whole display cannot be addressed before parts of the display decay back to their non-addressed state.

According to this invention a method of addressing a matrix liquid crystal display comprises the steps of applying a blanking voltage across a plurality of active areas of liquid crystal to change them to their on state, applying a substantially zero voltage between selected electrodes in sequence for sufficient time to cause a change in optical property in the liquid crystal at the intersection of those selected electrodes, and at other times applying a voltage to the electrodes to maintain a voltage across the liquid crystal layer at a sustaining value close to the threshold level.

Apparatus for carrying out the method of this invention includes a liquid crystal cell comprising a layer of liquid crystal material sandwiched between two slides at least one of which is transparent, each slide having on its inner surface spaced electrodes arranged to form a plurality of intersections across the liquid crystal layer, and further includes circuitry for applying a voltage to the electrodes to change the liquid crystal to its on state, circuitry for applying a voltage to the electrodes to maintain a sustaining voltage close to a threshold voltage across the liquid crystal layer, and circuitry for applying to selected intersections in sequence a zero voltage.

The voltages may be applied from a three phase voltage source in which case one phase is applied to electrodes on one slide and another phase applied to the other electrodes to maintain an r.m.s. value which is close to threshold level. To obtain a zero voltage between two electrodes at an intersection, the third phase voltage is applied to both electrodes.

Alternatively two different voltage waveforms of different frequency and voltage may be used.

A large display having $x$, $y$ electrodes in line and columns may be addressed by applying a blanking voltage, which changes the liquid crystal to its on state, line by line whilst addressing the previously blanked row with selective application of zero voltage to some active areas. Alternatively a block of lines may be blanked then addressed. For some displays the whole display may be blanked then individual lines addressed; to present a more uniform display successive frames may be addressed alternatively from top to bottom then bottom to top.

The term active area of liquid crystal is defined as the areas at the intersections between opposing electrodes.

The liquid crystal may be a positive nematic with between 1% and 90% of a cholesteric material.

Such a material mixture, when formed as a thin layer in a liquid crystal cell, scatters light in its off state with no electric field applied across the layer. Application of a blanking voltage, typically 30 volts r.m.s. for a 12 μm thick layer containing about 10% of cholesteric by weight, causes a realignment of liquid crystal molecules parallel to the applied field i.e. its on state. In this on state the layer is transparent. The time taken to turn from off to on depends on the amount of cholesteric material present, the layer thickness, and the applied voltage level. At a critical voltage, the threshold value, the molecules will start to change from their off state to their on state. If the voltage is suddenly removed from across the layer, the liquid crystal molecules return to their off state in typically 60 μsec for a layer thickness 12 μm containing 33% of cholesteric. However if a voltage having an r.m.s. value near this critical value is applied across the layer after the cell has been turned on it maintains its on state for up to about 40 secs or longer. In all cases the liquid crystal mixture may contain a suitable quantity, say 0.25% to 10% w/w of a dichroic or pleochroic dye or a mixture of such dyes. In this case the liquid crystal is opaque or coloured in its off state and becomes clear and colourless or changes colour when turned fully on.

The invention will now be described by way of example only in the accompanying drawings in which.

Figure 1:
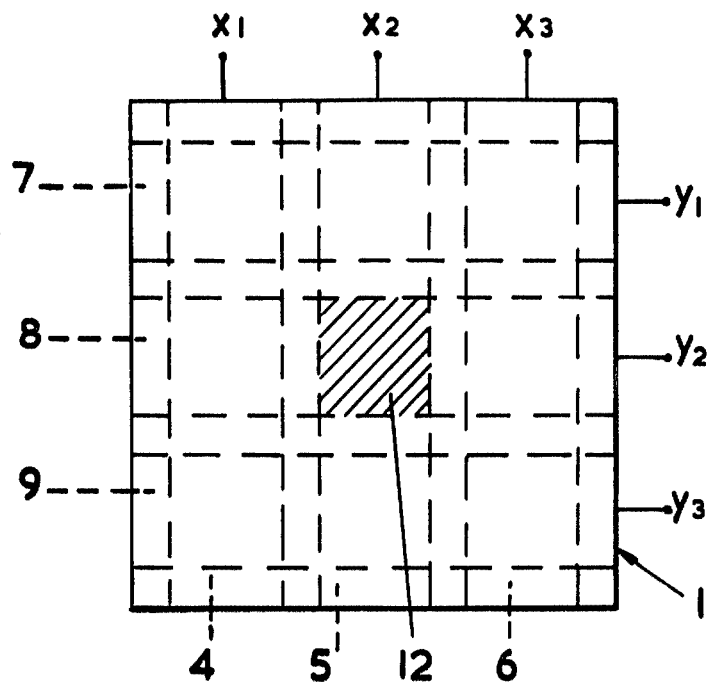
FIG. 1 is a front view of a three by three matrix display
Figure 2:
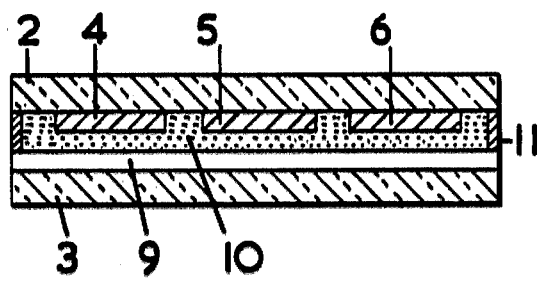
FIG. 2 is a sectional plan view of FIG. 1.

As seen in FIGS. 1, 2 a cell 1 comprises two glass slides 2, 3. The slide 2 carries three transparent ribbon shaped electrodes 4, 5, 6 forming column or $x$ electrodes whilst the slide 3 carries similar electrodes 7, 8, 9 forming line or $y$ electrodes. Typically the electrodes are 500A thick tin oxide deposited as a continuous layer and etched to the desired shape. Between the slides 2, 3 is a 6 μ to 40 μm thin layer 10 of liquid crystal material such as n-pentyls-cyanobiphenyl nematic material containing cholesteric material. An epoxy resin adhesive 11 is used to seal the edges of the cell 1. Electrical connections are made to each electrode.

A.C. voltages are applied to the cell 1 from a three phase sinusoidal supply (not shown). If V is the r.m.s. magnitude of the supply voltage, the supply from each phase may be indicated by $V\angle 0$, $V\angle 120$, $V\angle 240$. It may be shown that $$V\angle 0 - V\angle 120 = \sqrt{3}V\angle -30$$

$$V\angle 120 - V\angle 240 = \sqrt{3}V\angle 90$$

$$V\angle 240 - V\angle 0 = \sqrt{3}V\angle 210$$

In operation a blanking voltage of sufficiently high value is applied between each $x$ and $y$ electrode to cause an alignment of liquid crystal molecules parallel to the applied field. At each intersection of $x$, $y$ electrodes (an active area) the liquid crystal material 10 is transparent and light will pass through the cell 1. After the blanking voltage has been applied, a threshold voltage is applied as follows. A voltage $V\angle 120$ is applied to each $x$ electrode and a voltage $V\angle 240$ is applied to each $y$ electrode. At each electrode intersection the voltage is $V\angle 120 - V\angle 240 = \sqrt{3}V\angle 90$ and $\sqrt{3}V$ is arranged to approximately equal the threshold voltage $V_{th}$. Each intersection continues to appear transparent for up to about 40 seconds or longer. Assume now it is required to make the intersection at $x_2$, $y_2$ appear opaque i.e. the liquid crystal scatter light, this is shown at 12 in FIG. 1. A voltage $V\angle 0$ is applied to both electrodes $x_2$, $y_2$ resulting in zero voltage across the liquid crystal 10 at their intersection. All other intersections continue to have $\sqrt{3}V$ applied. For example at intersection $x_2y_1$ the voltage on $x_2$ is $V\angle 0$, and on $y_1$ is $V\angle 240$ resulting in $V\angle 240 - V\angle 0 = \sqrt{3}V\angle 210$. Once the intersection at $x_2y_2$ becomes opaque return of $\sqrt{3}V$ has insufficient effect to make the intersection appear transparent. Thus $\sqrt{3}V$ is re-applied to $x_2y_2$ and another intersection may be addressed with zero voltage. The whole of the cell 1 is addressed as required then the process is repeated i.e. a blanking voltage is applied to the whole cell, threshold voltages applied to the cell and selected intersections addressed.

The above described frame blanking for ease of understanding the various steps involved. In large displays it is preferable to blank a line at a time and address, with a zero voltage, a previously blanked line.

For a 12 $\mu$m thick layer nematic material with 10% cholesteric blanking voltage is typically 80 volts, threshold voltage i.e. $\sqrt{3}V$ is about 20 volts. For such conditions the liquid crystal becomes clear in about $10^3$ $\mu$s, and becomes scattering in about 1ms when zero voltage is applied to the electrodes. Thus a matrix of $10^3$ elements could be addressed intersection by intersection or $10^3$ lines could be addressed line by line in one second.

The three phase waveform may be a sine wave or square waveform. The liquid crystal responds to the r.m.s. value of the wave provided that its frequency has a period appreciably shorter than the response lines of the liquid crystal.

Figure 3:
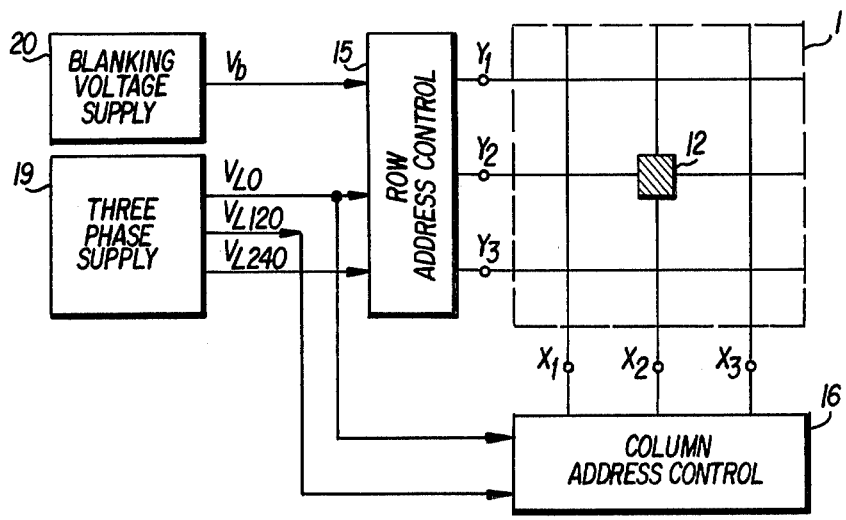
FIG. 3 is a schematic view of the matrix display of FIG. 1 showing how the blanking voltage and the three phases are supplied.

As shown in FIG. 3 the matrix display 1 has its three $y$ electrodes connected to a row address control circuit 15 while the three $x$ electrodes are connected to a column address control circuit 16. The row and column address control circuits are known devices which are actuated in a known manner in response to electrical replicas of the information to be displayed. A three phase supply 19 may be obtained from the circuit of FIG. 4. A blanking voltage $Vb$ supply 20 is connected to the row address control circuit 15.

The three phases $V\angle 0$, $V\angle 120$, $V\angle 240$ are connected as follows: $V\angle 0$ and $V\angle 240$ are connected to the row address control circuit 15 while $V\angle 0$ and $V\angle 120$ are connected to the column address control circuit 16.

The row address control circuit 15 applies $Vb$ to each line in turn for a line by line blanking operation (or to each line $y$ electrode simultaneously once per frame period for a frame blanking mode of operation). Also the row address control circuit 15 gates $V\angle 0$ to each $y$ electrode in turn while applying $V\angle 240$ to the line electrodes not receiving $Vb$ or $V\angle 0$.

Figure 5:
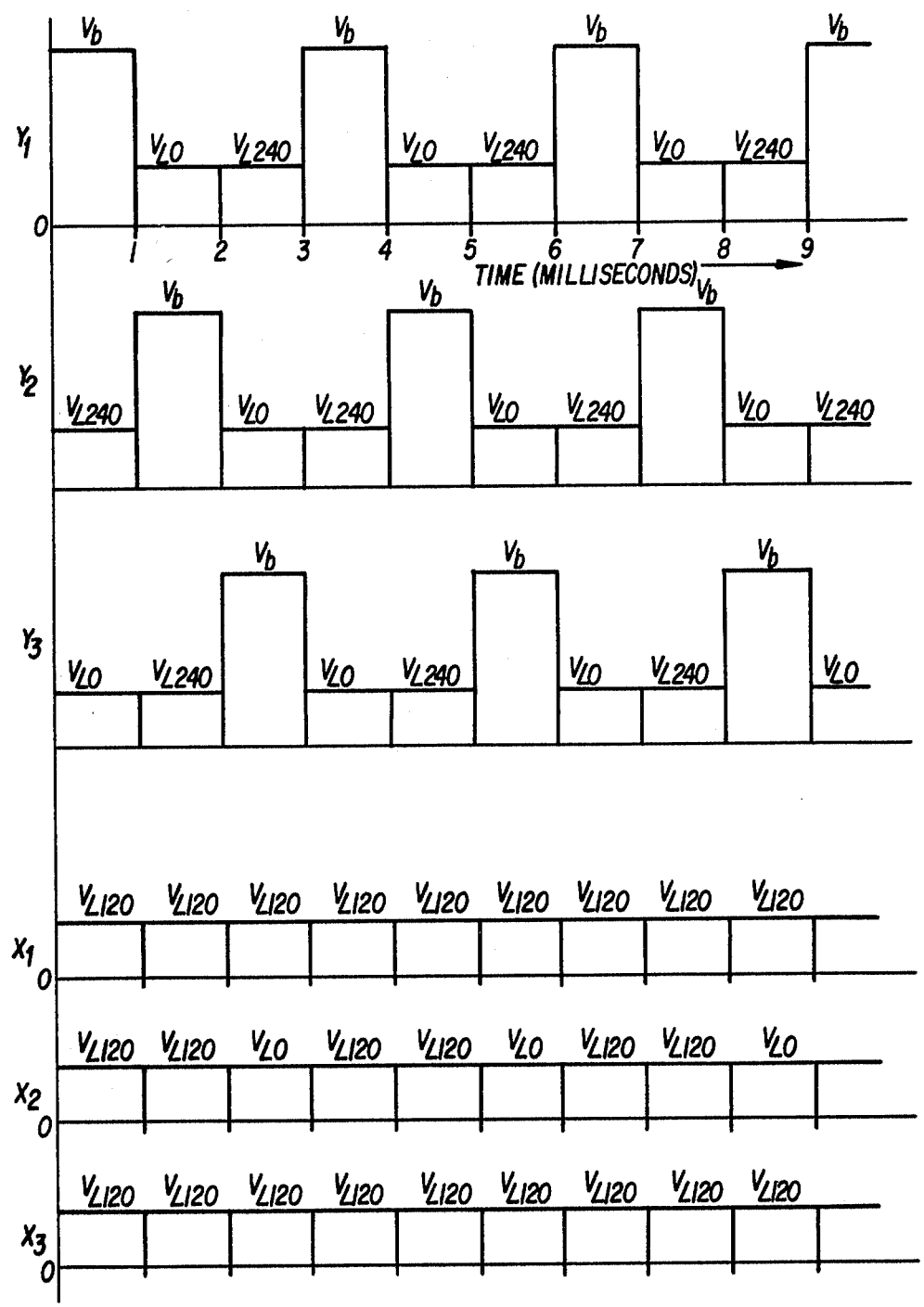
FIG. 5 shows half the envelope of voltages applied to the display of FIG. 3.

When line at a time blanking is used the operation is as follows: each line electrode $y$ repeatedly received in turn a blanking voltage, $V\angle 0$, and $V\angle 240$ as shown in FIG. 5. The duration of each voltage is about 1 millisecond or more. For larger displays each $y$ electrode will receive $V\angle 240$ for many time periods while the blanking voltage and $V\angle 0$ are clocked down the remaining $y$ electrodes.

Meanwhile, as voltages are clocked to the $y$ electrodes, the voltages $V\angle 0$ or $V\angle 120$ are synchronously applied to the column or $x$ electrodes through the column address control circuitry 16. Thus, the voltages applied to the $x$ electrodes to provide the display of FIG. 1 (with the center element 12 displayed) are as shown in FIG. 5.

Figure 4:
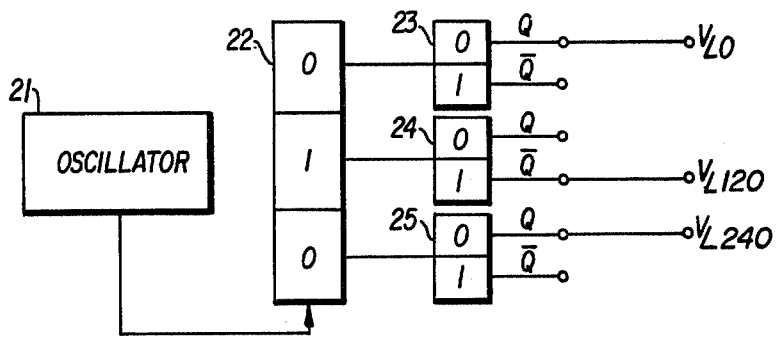
FIG. 4 shows a rectangular wave three phase supply.

To provide a three phase square waveform the generator of FIG. 4 may be used. This generator comprises an oscillator 21 whose output frequency, 6$f$, is fed into a recirculating three stage parallel output shift register 22 to recirculate a one and two zeros in the register. Each output stage has an input to one of three bistables 23, 24, 25 which change their states when their corresponding stage of the register contains a one. The bistables conventionally have so called true and complementary outputs Q and $\overline{Q}$ respectively (outputs 180° phased apart). Connections are made to the true outputs Q of bistables 23, 25 to form $V\angle 0$ and $V\angle 120$ respectively and also to the complement output $\overline{Q}$ of bistable 24 to form $V\angle 240$. These waveforms $V\angle 0$, $V\angle 120$, $V\angle 240$ are of frequency $f$ and phased apart by 120°. This frequency must be sufficiently high, e.g., about 10kHz, so that for the signals $V\angle 120 - V\angle 240$ the period of zero voltage across an intersection is small and insufficient to allow the liquid crystal to relax to its off state.

Figure 6:
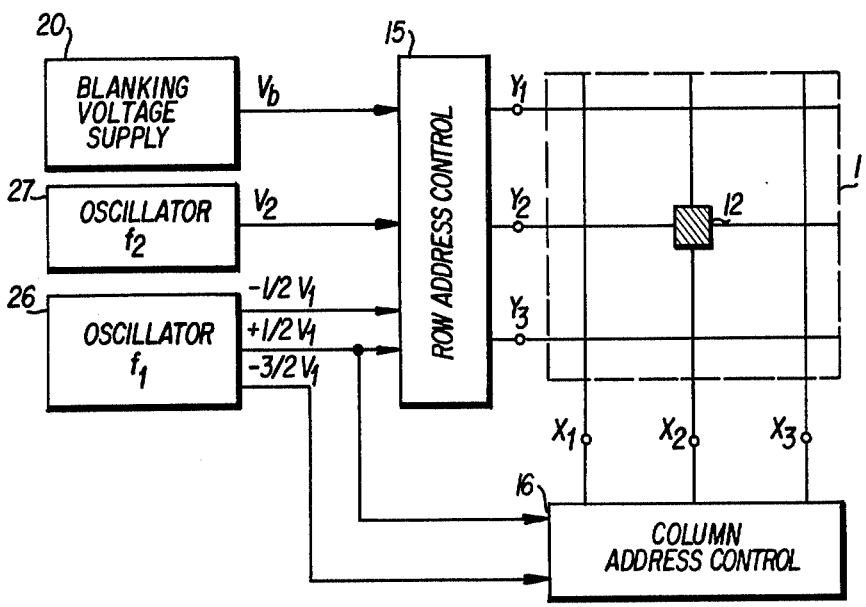
FIG. 6 is an alternative to FIG. 3 in which two different frequency waveforms are used.
Figure 7:
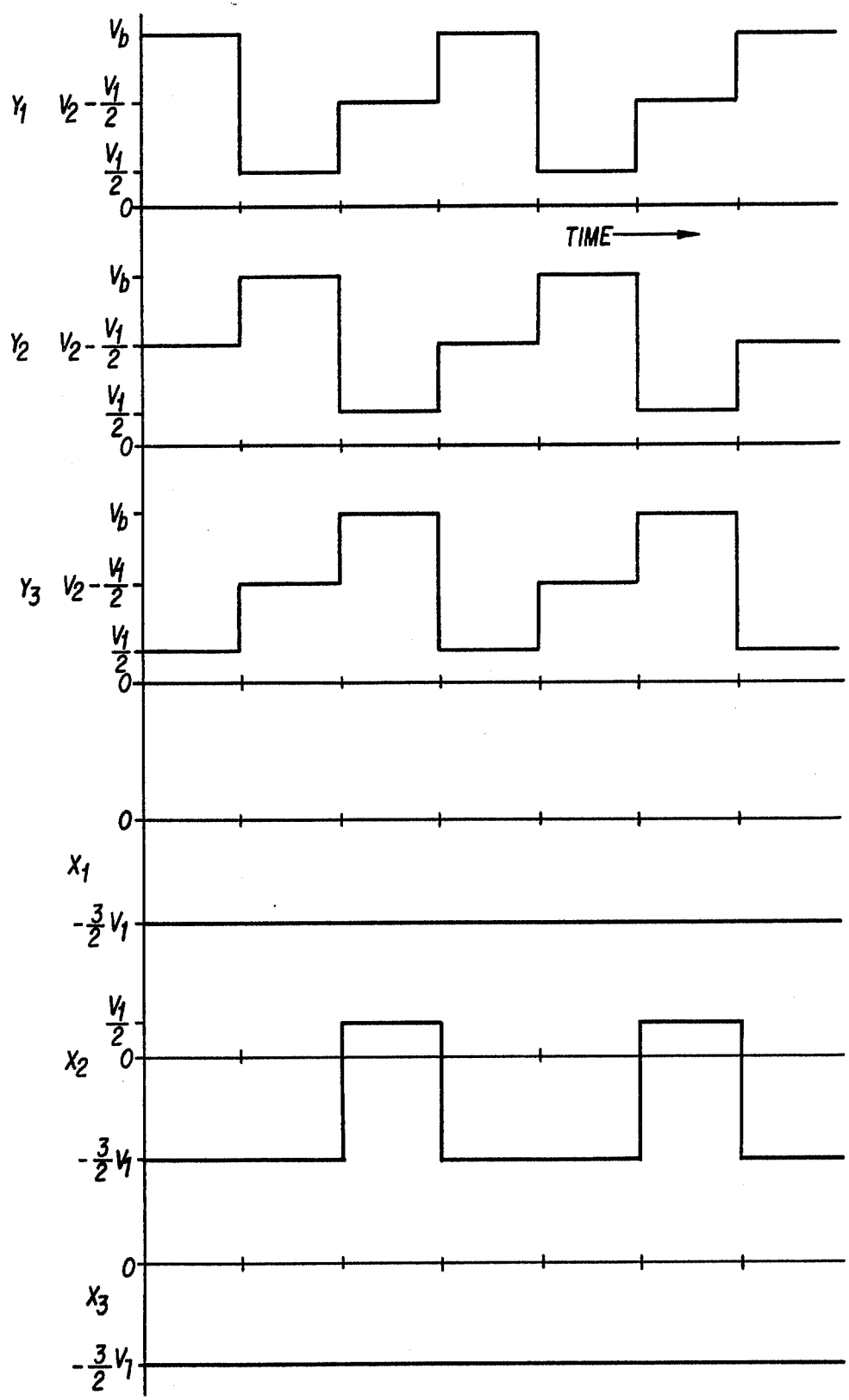
FIG. 7 shows half the envelope of voltages applied to the display of FIG. 6.

In another form of the invention, shown in FIG. 6, the cell is addressed by signals involving two different frequencies $f_1$ and $f_2$ having voltage waveforms of peak amplitude $V_1$ and $V_2$ applied as shown in FIG. 7.

$$\text{r.m.s. value of } (V_1 - V_2) = \frac{\sqrt{(V_1^2 + V_2^2)}}{\sqrt{2}} = \text{r.m.s. value of } (V_1 + V_2)$$

$$\text{If } \frac{\sqrt{(V_1^2 + V_2^2)}}{\sqrt{2}} = \sqrt{2}\,V_1$$

$$\text{i.e. } V_1 = \pm \frac{V_2}{\sqrt{3}}$$

The cell 1 of FIG. 1 is addressed as shown in FIG. 6 which is similar to FIG. 3 with like components given like numerals. The waveforms are generated by oscillator and amplifier circuits 26, 27 which generate $V_1$, $f_1$ and $V_2 f_2$ respectively. The circuit 26 has outputs giving $+ \frac{1}{2}V_1$, $- \frac{1}{2}V_1$, and $- 3/2V_1$, the signals ± designating phase.

When operating in a line by line blanking mode each y electrode receives in sequence $V_b$, $\frac{1}{2}V_1$, and $V_2 - \frac{1}{2}V_1$ as shown in FIG. 7. Meanwhile the column electrode x receives $- 3/2V_1$ except for $x_2$ which receives $\frac{1}{2}V_1$ for the same period that $y_2$ receives $\frac{1}{2}V_1$. As a result each intersection x, y receives a blanking voltage to form the liquid crystal into its transparent on state. While intersection $x_2, y_2$ is being addressed $\frac{1}{2}V_1$ is applied to both $x_2$, $y_2$ electrodes resulting in zero volts at $x_2, y_2$ but all other intersections receive $\frac{1}{2}V_1 - (V_2 - \frac{1}{2}V_1) = V_1 + V_2$ (e.g. at $x_2y_1$) or $- 3/2V_1 - (V_2 - \frac{1}{2}V_1) = - (V_1 + V_2)$ (e.g. at $x_1 Y_1$). The r.m.s. value of $V_1 + V_2$ equals $- (V_1 + V_2)$ and is arranged to approximately equal the threshold r.m.s. value.

The frequencies $f_1, f_2$ must be such that $f_1 >> f_2$ or $f_1 << f_2$ to avoid beating.

The examples given illustrate the addressing of individual elements in the matrix. The addressing scheme may also be used to address the display line at a time using known techniques.

The technique need not be confined to x-y matrices. It may also be used with r-θ polar plot displays and with seven segments type numeric displays.

I claim:

1. A liquid crystal display comprising a layer of liquid crystal material contained between two slides at least one of which is transparent, the slides carrying spaced electrodes arranged to provide a plurality of intersections whereby the display can be addressed in matrix form, and further comprising means for applying across the liquid crystal layer at a plurality of electrode intersections a blanking voltage to turn the layer into an on state, means for applying across selected intersections previously turned on a voltage substantially below a threshold voltage level to turn the layer at those selected intersections to an off state, and means for applying to the layer at electrode intersections, a voltage close to a threshold value at other times.

2. A display according to claim 1 wherein the means for applying a voltage substantially below a threshold voltage and the means for applying a voltage close to a threshold voltage comprises means for applying three similar waveforms spaced apart in phase by 120°.

3. A display according to claim 1 wherein the means for applying a voltage substantially below a threshold voltage and the means for applying a voltage close to a threshold voltage comprises means for applying two waveforms of different frequencies.

4. A display according to claim 1 wherein the electrode intersections are arranged in lines and columns and the blanking voltage is applied to a line at a time.

5. A display according to claim 1 wherein the electrode intersections are arranged in lines and columns and the blanking voltage is applied to the whole display and the below threshold voltage is applied line by line whilst the voltage close to the threshold voltage is applied at intersections not receiving the below threshold voltage.

6. A display according to claim 1 wherein the liquid crystal layer is a nematic liquid crystal material containing a cholesteric liquid crystal material.

7. A display according to claim 6 wherein the liquid crystal layer contains at least one pleochroic dye.

8. A liquid crystal display comprising a layer of nematic and cholesteric liquid material contained between two slides at least one of which is transparent, transparent x, and y strip electrodes arranged in lines and columns on the slides to form an x, y matrix having x times y electrode intersections, a three phase voltage supply source for supplying three waveforms spaced 120° apart in phase, means for supplying a blanking voltage across the layer in a line to turn the layer to an on state, means for applying one of the three waveforms to the x electrodes and means for applying a second of the waveforms to the y electrodes whereby the x, y intersection receives a threshold voltage, and means for applying the third of the waveforms to both x and y electrodes at an intersection required to be turned from an on to an off state.

9. A method for selectively exciting a liquid crystal material which comprises enclosing a layer comprising liquid crystal material between two light polarizer members at least one of which is transparent, said members having electrodes disposed on their facing sides which are arranged to intersect at a plurality of points, applying a blanking voltage across the liquid crystal material to turn it into an on state, applying after the blanking voltage has been applied a voltage at electrode intersections near the threshold voltage of the liquid crystal material which will change the liquid crystal layer only slowly from on to off, and applying at selected intersections a voltage substantially below the threshold voltage which will turn the layer quickly to off whereby the liquid crystal layer is light transmitting at selected intersections.

* * * * *